United States Patent [19]
Bellussi et al.

[11] Patent Number: 5,500,199
[45] Date of Patent: Mar. 19, 1996

[54] BONDED ZEOLITES AND PROCESS FOR PREPARING THEM

[75] Inventors: Giuseppe Bellussi, Piacenza; Franco Buonomo, San Donato Milanese; Antonio Esposito, San Donato Milanese; Mario G. Clerici, San Donato Milanese; Ugo Romano, Vimercate, all of Italy

[73] Assignee: Eniricerche S.p.A., Milan, Italy

[21] Appl. No.: 217,072

[22] Filed: Mar. 24, 1994

Related U.S. Application Data

[63] Continuation of Ser. No. 964,653, Oct. 21, 1992, abandoned, which is a continuation of Ser. No. 742,150, Aug. 1, 1991, abandoned, which is a continuation of Ser. No. 537,886, Jun. 14, 1990, abandoned, which is a continuation of Ser. No. 110,330, Oct. 20, 1987, abandoned.

[30] Foreign Application Priority Data

Oct. 22, 1986 [IT] Italy ................................. 22075/86

[51] Int. Cl.$^6$ ............................. C01B 33/26; B01J 29/06
[52] U.S. Cl. .................. 423/328.2; 423/700; 423/330.1; 502/60; 502/64; 502/70
[58] Field of Search ................... 502/60, 64, 70; 423/700, 702, 705, 716, 328.2, 330.1

[56] References Cited

U.S. PATENT DOCUMENTS

| | | | |
|---|---|---|---|
| 3,326,818 | 6/1967 | Gladrow et al. | 502/64 |
| 3,356,450 | 12/1967 | Heinze | 423/716 |
| 3,377,295 | 4/1968 | Pryor | 502/64 |
| 4,206,085 | 6/1980 | Lim et al. | 502/64 |
| 4,526,767 | 7/1985 | Robinson et al. | 423/702 |
| 4,582,815 | 4/1986 | Bowes | 502/64 |
| 4,594,332 | 6/1986 | Hoelderich et al. | 502/64 |
| 4,631,267 | 12/1986 | Lachman et al. | 502/64 |
| 4,701,428 | 10/1987 | Bellussi et al. | 502/242 |
| 4,743,573 | 5/1988 | Romano et al. | 502/64 |
| 4,800,187 | 1/1989 | Lachman et al. | 502/68 |
| 4,849,387 | 7/1989 | Romano et al. | 502/64 |
| 4,859,785 | 8/1989 | Bellussi et al. | 549/531 |
| 4,954,653 | 9/1990 | Bellussi et al. | 564/223 |
| 5,003,125 | 3/1991 | Giustl et al. | 585/417 |
| 5,316,993 | 5/1994 | Sextl et al. | 502/64 |

FOREIGN PATENT DOCUMENTS 0200260 12/1986 European Pat. Off. .

*Primary Examiner*—Anthony McFarlane
*Attorney, Agent, or Firm*—Roger & Wells

[57] ABSTRACT

Zeolites having a pore diameter comprised within the range of from 5 to 12 Å are bonded with amorphous oligomeric silica, by dispersing them in an aqueous solution of silica and alkylammonium hydroxide, and submitting the obtained suspension to a quick drying.

22 Claims, No Drawings

BONDED ZEOLITES AND PROCESS FOR PREPARING THEM

This application is a continuation of Ser. No. 07/964,653, filed Oct. 21, 1992, now abandoned, which is continuation of Ser. No. 07/742,150, filed Aug. 01, 1991, now abandoned, which is continuation of Ser. No. 07/537,886, filed Jun. 14, 1990, now abandoned, which is continuation of Ser. No. 07/110,330, filed Oct. 20, 1987, now abandoned.

The present invention relates to bonded zeolites, and to a process for producing them.

It is known that zeolites can be bonded by means of inorganic bonding agents, in order to increase their size, and enable them to be used in industrial plants.

The systems known from the prior art show however the drawback that they partially occlude the zeolitic cavities, thus decreasing their activity.

The present Applicant has surprisingly found now that it is possible to produce bonded zeolites without the above-said drawbacks.

The process for preparing zeolites with a bonding agent according to the present invention consists in mixing an aqueous solution of oligomeric silica and alkyl-ammonium hydroxide, wherein the molar ratio in solution between the oligomeric silica and alkyl-ammonium hydroxide is comprised within the range of from 0.05 to 0.2, preferably of from 0.08 to 0.15, and the molar ratio between the oligomeric silica and water is comprised within the range of from 0.025 to 0.0125, with a suspension of zeolite in water, wherein the percentage of zeolite in the suspension of only zeolite in water is comprised within the range of from 20 to 50% by weight, preferably of from 25 to 35% by weight, the weight ratio between the oligomeric silica and zeolite is comprised within the range of from 5:95 to 20:80, and in submitting the obtained suspension to a quick drying.

The zeolite can be selected from:

1) a calcined and anhydrous zeolite, 2) a calcined, anhydrous zeolite preferably exchanged with ammonium ions, 3) a damp zeolite containing as the counter-cations, ammonium or alkyl-ammonium cations, optionally in the presence of an excess of the related hydroxides, as it is obtained by means of a hydrothermal treatment, without carrying out the final calcination thereof.

In the following of the present disclosure, examples of preparation of such non-calcined zeolites are supplied.

The alkyl-ammonium hydroxide dissolved in the aqueous solution of silica is preferably selected from those having alkyls containing a number of carbon atoms comprised within the range of from 1 to 5; more preferably, it is tetrapropyl-ammonium.

Said solution is prepared, in particular, by hydrolysing at a temperature comprised within the range of from 2° C. to 120° C., preferably of from 5° to 60° C., in the liquid phase, a tetraalkyl-orthosilicate, preferably tetraethyl-orthosilicate, in an aqueous solution of alkyl-ammonium hydroxide, for a time comprised within the range of from 0.2 to 24 hours.

The present Applicant has surprisingly found that zeolites having a diameter of the pores comprised within the range of from 5 to 13 Å are particularly suitable for the process of the present invention. They, following the process of the invention, result [to be] in a form bonded with amorphous oligomeric silica, wherein the molar ratio of the oligomeric silica to zeolite is comprised within the range of from 5:95 to 20:80. The zeolite crystals are caged by means of Si—O—Si bridges and the mass of the zeolite crystals with silica is in the form of microspheres having a diameter comprised within the range of from 5 to 1,000 μm.

Still more particularly, it was found that suitable zeolites for said process are those which meet the following general formula, expressed as the molar ratios (in the calcined and anhydrous form):

1) $pHAlO_2.cB_2O_3.SiO_2$ with the condition that, for zeolite hydrates containing ammonium bases, if the weight of the calcined and anhydrous zeolite is called "Z", the weight of ammonium ion or of alkyl-ammonium base is called "$A^+$", and the weight of water is called "H", the following relationships are met:

$$\frac{H}{H+A^++Z} \cdot 100 = 23\text{--}28\%;$$

$$\frac{A^+}{H+A^++Z} \cdot 100 = 7\text{--}12\%,$$

wherein in the general formula (1), p has a value comprised within the range of from 0.034 to 0.0050, and g has a value comprised within the range of from 0.1 to 0.005, and the $H^+$ of $HAlO_2$ can be at least partially replaced by cations, the zeolite of formula (1) having an X-ray diffraction spectrum of the powders, whose meaningful lines are reported in Table A:

TABLE A

| d | $I_{rel}$ |
|---|---|
| 11.12 + 0.10 | vs |
| 9.98 + 0.10 | s |
| 9.74 + 0.10 | m |
| 6.34 + 0.07 | mw |
| 5.97 + 0.07 | mw |
| 4.24 + 0.05 | mw |
| 3.84 + 0.04 | s |
| 3.81 + 0.04 | s |
| 3.73 + 0.04 | s |
| 3.71 + 0.04 | s |
| 3.63 + 0.04 | m |
| 3.84 + 0.02 | mw |
| 2.97 + 0.02 | mw | wherein d are the interplanar distances, as Å, and $I_{rel}$ are the relative intensities, wherein vs means very strong; s=strong; m=medium; mw=medium-weak; w=weak; and an I.R. spectrum at least showing the following bands:

| wn | $I_{rel}$ |
|---|---|
| 1220–1230 | w |
| 1080–1110 | s |
| 890–920 | mw |
| 795–805 | mw |
| 550–560 | m |
| 450–470 | ms | wherein wn is the wave number, as $cm^{-1}$ and $I_{rel}$ are the relative intensities, wherein s means strong; ms=medium-strong; m=medium; mw=medium-weak; w=weak.

2) $pHAlO_2.qTiO_2.SiO_2$ with the condition that, for zeolite hydrates containing ammonium bases, if the weight of the calcined and anhydrous zeolite is called "Z", the weight of ammonium ion or of alkyl-ammonium base is called "$A^+$", and the weight of water is called "H", the following relationships are met:

$$\frac{H}{H + A^+ + Z} \cdot 100 = 23\text{--}28\%;$$

$$\frac{A^+}{H + A^+ + Z} \cdot 100 = 7\text{--}12\%,$$

wherein in the general formula (2), p has a value larger than zero and smaller than, or equal to 0,050, and g has a value larger than zero and smaller than or equal to 0.025; and the $H^+$ of $HAlO_2$ can at least partially replaceable, or replaced, by cations, wherein the zeolite having the general formula (2) has an X-ray diffraction spectrum of the powders, whose most meaningful lines are reported in following Table B:

TABLE B

| d | $I_{rel}$ |
| --- | --- |
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.86 + 0.04 | s |
| 3.82 + 0.04 | s |
| 3.75 + 0.04 | s |
| 3.72 + 0.04 | s |
| 3.65 + 0.04 | m |
| 3.05 + 0.02 | mw |
| 2.99 + 0.02 | mw | wherein d are the interplanar distances, as Å, and $I_{rel}$ are the relative intensities, wherein vs means very strong; s=strong; m=medium; mw=medium-weak; w=weak; and the zeolite having the general formula (2) shows an I.R. spectrum at least showing the following bands:

| wn | $I_{rel}$ |
| --- | --- |
| 1220–1230 | w |
| 1080–1110 | s |
| 960–975 | mw |
| 795–805 | mw |
| 550–560 | m |
| 450–470 | ms | wherein wn is the wave number, as $cm^{-1}$ and $I_{rel}$ are the relative intensities, wherein s means strong; ms=medium-strong; m=medium; mw=medium-weak; W=weak.

$pHFeO_2.qTiO_2.SiO_2$ with the condition that, for zeolite hydrates containing ammonium bases, if the weight of the calcined and anhydrous zeolite is called "Z", the weight of ammonium ion or of alkyl-ammonium base is called "$A^+$", and the weight of water is called "H", the following relationships are met:

$$\frac{H}{H + A^+ + Z} \cdot 100 = 23\text{--}28\%;$$

$$\frac{A^+}{H + A^+ + Z} \cdot 100 = 7\text{--}12\%,$$

wherein in the general formula (3), g has a value larger than zero and smaller than, or equal to 0.050, and g has a value larger than zero and smaller than or equal to 0.025; and the $H^+$ of $HFeO_2$ can be at least partially replaceable, or replaced, by cations, wherein the zeolite having the general formula (3) has an X-ray diffraction spectrum of the powders, whose most meaningful lines are reported in Table C:

TABLE C

| d | $I_{rel}$ |
| --- | --- |
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.86 + 0.04 | s |
| 3.82 + 0.04 | s |
| 3.75 + 0.04 | s |
| 3.72 + 0.04 | s |
| 3.65 + 0.04 | m |
| 3.05 + 0.02 | mw |
| 2.99 + 0.02 | mw | wherein d are the interplanar distances, as Å, and $I_{rel}$ are the relative intensities, wherein vs means very strong; s=strong; m=medium; mw=medium-weak; w=weak, and wherein the zeolite having the general formula (3) shows an I.R. spectrum at least showing the following bands:

| wn | $I_{rel}$ |
| --- | --- |
| 1220–1230 | w |
| 1080–1110 | s |
| 960–975 | mw |
| 795–805 | mw |
| 550–560 | m |
| 450–470 | ms | wherein wn is the wave number, as and $cm^{-1}$ and $I_{rel}$ are the relative intensities, wherein s means strong; ms=medium-strong; m=medium; mw=medium-weak; w=weak;

4) $xTiO_2.(1-x)SiO_2$ with the condition that, for zeolite hydrates containing ammonium bases, if the weight of the calcined and anhydrous zeolite is called "Z", the weight of ammonium ion or of alkyl-ammonium base is called "$A^+$", and the weight of water is called "H", the following relationships are met:

$$\frac{H}{H + A^+ + Z} \cdot 100 = 23\text{--}28\%;$$

$$\frac{A^+}{H + A^+ + Z} \cdot 100 = 7\text{--}12\%,$$

wherein in the general formula (4), x is comprised within the range of from 0.0001 to 0.04, preferably of from 0.01 to 0.025; for the further characterization, reference is made to U.S. Pat. No. 4,410,501;

5) zeolites based on Si and B, of A, B, C and D type, according to FR patent No. 2,429,182, and of the type disclosed in French patent application No. 2,526,414, and in European patent appln. publ. No. 98,641. For their characterization, reference is made to said patent literature;

6) ZSM-5; according to U.S. Pat. No. 3,702,886 and U.S. Pat. No. Re. 29,948;

7) ZSM-11; according to from U.S. Pat. No. 3,709,979;

8) T Zeolite; according to DE patent No. 3,139,355.

Zeolites 1, 2, 3, 4, 5, 6, 7 and 8 are prepared by means of the following procedures:

Zeolite 1:

Under hydrothermal conditions a silicon derivative, a boron derivative, an aluminum derivative and a nitrogenous organic base are reacted, with an $SiO_2/Al_2O_3$ molar ratio of the reactants larger than 100, preferably comprised within the range of from 300 to 400, an $SiO_2/B_2O_3$ molar ratio of the reactants comprised within the range of from 5 to 50, an $H_2O/SiO_2$ molar ratio of the reactants preferably comprised within the range of from 20 to 40, possibly in the presence of one or more alkali- and or alkali-earth-metal salts and/or hydroxides, with a molar $M/SiO_2$ ratio (wherein M is the alkali- and/or alkali-earth-metal cation) of the reactants smaller than 0.1, preferably smaller than 0.01, or equal to zero.

In the empirical formula of the material, aluminum has been shown in $HAlO_2$ form, to underline that the material is in the $H^+$ form. When the ratios between the various reactants are discussed, for aluminum the $Al_2O_3$ form is used, in that it is the most usual.

The silicon derivative is selected from silica gel, silica so 1 and alkyl-silicates, among which tetraethyl-silicate is the most preferred; the boron derivative is selected from boric acid and the organic derivatives of boron, such as, e.g., alkyl-borates, preferably triethyl-borate; the aluminum derivative is selected from its salts, such as, e.g., the halides and the hydroxides, and its organic derivatives, such as, e.g., the alkyl aluminates, preferably isopropyl-aluminate.

The nitrogenous organic base can be an alkyl-ammonium hydroxide, preferably tetrapropyl-ammonium hydroxide.

In case tetrapropyl-ammonium hydroxide is used, the $TPA^+/SiO_2$ ratio (wherein TPA=tetrapropyl-ammonium) of the reactants is comprised within the range of from 0.1 to 1, preferably of from 0.2 to 0.4.

The reactants are reacted by operating at a temperature comprised within the range of from 100 to 200° C., preferably comprised within the range of from 160° to 180° C., at a pH comprised within the range of from 9 to 14, preferably of from 10 to 12, and for a time ranging from 1 hour to 5 days, preferably of from 3 hours to 10 hours.

Zeolite 2:

Under hydrothermal conditions a silicon derivative, a titanium derivative, an aluminum derivative and a nitrogenous organic base are reacted, with an $SiO_2/Al_2O_3$ molar ratio of the reactants larger than 100, preferably comprised within the range of from 300 to 400, an $SiO_2/TiO_2$ molar ratio of the reactants larger than 5, preferably comprised within the range of from 15 to 25, an $H_2O/TiO_2$ molar ratio of the reactants preferably comprised within the range of from 10 to 100, more preferably within the range of from 30 to 50, possibly in the presence of one or more alkali- and or alkali-earth-metal salts and/or hydroxides, with a molar $M/SiO_2$ ratio (wherein M is the alkali- and/or alkali-earth-metal cation) of the reactants smaller than 0.1, preferably smaller than 0.01, or equal to zero.

In the empirical formula of the material, aluminum has been shown in the $HAlO_2$ form, to underline that the material is in the $H^+$ form. When the ratios between the various reactants are discussed, for aluminum the $Al_2O_3$ form is used, in that it is the most usual.

The silicon derivative is selected from silica gel, silica sol and alkyl-silicates, among which tetraethyl-silicate is the most preferred; the titanium derivative is selected from the salts, such as, e.g., the halides, and the organic derivatives of titanium, such as, e.g., alkyl-titanates, preferably triethyl-titanate; the aluminum derivative is selected from its salts, such as, e.g., the halides and the hydroxides, and its organic derivatives, such as, e.g., the alkyl aluminates, preferably isopropyl-aluminate.

The nitrogenous organic base can be an alkyl-ammonium hydroxide, preferably tetrapropyl-ammonium hydroxide.

In case tetrapropyl-ammonium hydroxide is used, the $TPA^+/SiO_2$ ratio (wherein TPA=tetrapropyl-ammonium) of the reactants is comprised within the range of from 0.1 to 1, preferably of from 0.2 to 0.4.

The reactants are reacted by operating at a temperature comprised within the range of from 100° to 200° C., preferably comprised within the range of from 160° to 180° C., at a pH comprised within the range of from 9 to 14, preferably of from 10 to 12, and for a time ranging from 1 hour to 5 days, preferably of from 3 hours to 10 hours.

Zeolite 3:

Under hydrothermal conditions a silicon derivative, a titanium derivative, an iron derivative and a nitrogenous organic base are reacted, with an $SiO_2/Fe_2O_3$ molar ratio of the reactants larger than 50, preferably comprised within the range of from 150 to 600, an $SiO_2/TiO_2$ molar ratio of the reactants larger than 5, preferably comprised within the range of from 15 to 25, an $H_2O/SiO_2$ molar ratio of the reactants preferably comprised within the range of from 10 to 100, more preferably within the range of from 30 to 50, possibly in the presence of one or more alkali- and or alkali-earth-metal salts and/or hydroxides, with a molar $M/SiO_2$ ratio (wherein M is the alkali- and/or alkali-earth-metal cation) of the reactants smaller than 0.1, preferably smaller than 0.08, or equal to zero.

In the empirical formula of the material, iron has been shown in $HFeO_2$ form, to underline that the material is in $H^+$ form. When the ratios between the various reactants are discussed, for iron the $Fe_2O_3$ form is used, in that it is the most usual.

The silicon derivative is selected from silica gel, silica sol and alkyl-silicates, among which tetraethyl-silicate is the most preferred; the titanium derivative is selected from the salts, such as, e.g., the halides, and the organic derivatives of titanium, such as, e.g., alkyl-titanates, preferably tetraethyl-titanate; the aluminum derivative is selected from its salts, such as, e.g., the halides or the nitrates, the hydroxides, and the organic derivatives, such as, e.g., the alkoxides.

The nitrogenous organic base can be an alkyl-ammonium hydroxide, preferably tetrapropyl-ammonium hydroxide.

In case tetrapropyl-ammonium hydroxide is used, the $TPA^+/SiO_2$ ratio (wherein TPA=tetrapropyl-ammonium) of the reactants is comprised within the range of from 0.1 to 1, preferably of from 0.2 to 0.4.

The reactants are reacted by operating at a temperature comprised within the range of from 100° to 200° C., preferably comprised within the range of from 160° to 180° C., at a pH comprised within the range of from 9 to 14, preferably of from 10 to 12, and for a time ranging from 1 hour to 5 days, preferably of from 3 hours to 10 hours.

Zeolite 4:

Preparation according to U.S. Pat. No. 4,410,501.

Zeolites 5:

Zeolites based on Si and B of A, B, C and D type; preparations according to FR patent No. 2,429,182; and of the types disclosed in French patent application No. 2,526,414; and in European patent appln. Publ. No. 98,641: for their preparation, reference is made to the above cited patent literature.

Zeolite 6:

ZSM-5; preparation as disclosed by U.S. Pat. No. 3,702,886 and U.S. Pat. No. Re. 29,948.

Zeolite 7:

ZSM-11; preparation according to U.S. Pat. No. 3,709,979.

Zeolite 8:

T Zeolite; preparation according to DE patent No. 3,139, 355.

The following Examples illustrate the specific non-limitative preparations of some of the zeolites used, and some specific, non-limitative preparation of the zeolites with bonding agent.

EXAMPLE 1

Zeolite 1

67.8 g of $Al(NO_3)_3.9H_2O$ is dissolved in 1,275 g of ethyl alcohol and to the so-obtained solution 2,819 g of tetraethyl-silicate is added, with stirring until a homogeneous and clear solution is obtained.

To a stainless-steel vessel 1,036 g of deionized water, 8,878 g of an aqueous solution at 15.5% by weight of tetrapropyl-ammonium ($TPA^+$) hydroxide and 167.5 g of boric acid powder are charged in the order shown, with stirring.

When all the acid has gone into solution, to this latter solution the previously obtained solution is added, and the mixture is stirred, while being heated at 60° C. for approximately 4 hours, and anyway until the hydrolysis of the silicate is complete and the ethyl alcohol present is nearly completely removed. The molar composition of the reaction mixture is the following:

$SiO_2/Al_2O_3=150$;

$SiO_2/B_2O_3=10$;

$TPA^+/SiO_2=0.5$;

$H_2O/SiO_2=35$.

The so-obtained solution is charged to an autoclave equipped with stirring means, and is heated, under its autogenous pressure, at 170° C., for 4 hours. The discharged product is centrifuged, and the centrifuge cake is carefully dispersed in 70 liters of deionized water; the obtained suspension is centrifuged again, yielding a washed cake.

A portion of the obtained product is calcined in air for 5 hours at 550° C., and at the end it shows to be a zeolite having, in the anhydrous form, the following composition:

$0.0098Al_2O_3$; $0.0108B_2O_3$; $SiO_2$.

EXAMPLE 2

Zeolite 1 with Bonding Agent

The zeolite is prepared as disclosed in Example 1, then 219 g of tetraethyl-silicate is added, with vigorous stirring, to 234 g of aqueous solution of tetrapropyl-ammonium hydroxide at 12% by weight, and the reaction mixture is stirred for 1 hour at 60° C.; then, 958 g of demineralized water is added to it, and stirring is continued for a further hour. A clear solution is thus obtained, inside which 875 g of the centrifuging cake of zeolites of Example 1, prepared as above said, containing 9% by weight of $TPA^+$, 26% by weight of water and 65% by weight of zeolite 1 is added.

The milky suspension resulting from the dispersion is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 μm.

The atomized product is charged to a muffle under a $N_2$ atmosphere, and is heated up to 550° C. After a 2-hour stay at that temperature under $N_2$, the atmosphere is gradually turned from $N_2$ to air, and the product is left standing a further two hours at 550° C. in air.

The obtained product has the following molar composition:

$0.0088Al_2O_3$; $0.0097B_2O_3$; $SiO_2$.

EXAMPLE 3

Zeolite 2

27 g of aluminum isopropoxide is dissolved in 5,400 g of solution at 18.7% by weight of tetrapropyl-ammonium hydroxide.

Separately, 230 g of tetraethyl-orthotitanate is dissolved in 4,160 g of tetraethyl-silicate, and this solution is added to the previous one, with stirring.

The resulting mixture is heated up to 50°–60° C., always with stirring, until a single-phase solution is obtained; then, 10,000 cc of water is added.

The so-obtained solution is charged to an autoclave and is heated, under its autogenous pressure, at 170° C., for 4 hours.

The product discharged from the autoclave is centrifuged and washed twice by re-dispersion and centrifugation. A portion of the washed centrifuge cake is calcined in air for 5 hours at 550° C., and at the end it shows to be a zeolite having, in the anhydrous form, the following composition:

$0.0081Al_2O_3$; $0.0250TiO_2$; $SiO_2$.

EXAMPLE 4

Zeolite 2 with Bonding Agent

The zeolite is prepared as in Example 3, then 320 g of of tetraethyl-silicate is added with vigorous stirring to 340 g of an aqueous solution of tetrapropyl-ammonium hydroxide at 12% by weight, and the resulting mixture is stirred 1 hour at 60° C.; then, 1,4000 g of demineralized water is added, and the solution is kept stirred a further hour.

A clear solution is so obtained, into which 1,280 g is carefully dispersed of the washed centrifugation cake of zeolite 2, prepared as disclosed above, containing 9% by weight of $TPA^+$ and 26% by weight of water, and 65% of zeotite 2.

The milky suspension resulting from the dispersion is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 μm.

The atomized product is charged to a muffle under a $N_2$ atmosphere and is heated up to 550° C. After a 2-hour stay at that temperature, the atmosphere is gradually turned from $N_2$ to air, and the product is left standing a further two hours at 550° C. in air.

The obtained product has the following molar composition:

$0.0073Al_2O_3$; $0.0225TiO_2$: $SiO_2$.

EXAMPLE 5

Zeolite 3

This Example illustrates the preparation of titanium-ferrosilicalite.

20.2 g of Fe(NO$_3$)$_3$.9H$_2$O is dissolved in water, and from the solution the hydroxide is precipitated by means of the addition of ammonium hydroxide. The precipitate is filtered off, and is washed by being re-dispersed in cold water and filtered until the filtrate turns to neutral. The damp hydroxide is then dissolved in 2,700 g of solution of tetrapropyl-ammonium hydroxide at 18.7% by weight.

Separately, 114 g of tetraethyl-orthotitanate is dissolved in 2,080 g of tetraethyl-orthosilicate, and this solution is added to the previous one, with stirring.

The resulting mixture is heated up to 50°–60° C., always with stirring, until a single-phase solution is obtained; then, 5,000 cc of water is added.

The so-obtained solution is charged to an autoclave and is heated, under its autogenous pressure, at 170° C., for 4 hours.

The product discharged from the autoclave is centrifuged and washed twice by re-dispersion and centrifugation. A portion of the washed centrifuge cake is calcined in air 4 hours at 550° C., and at the end it shows to be a zeolite having, in the anhydrous form, the following composition:

0.0025Fe$_2$O$_3$;0.0208TiO$_2$;SiO$_2$.

EXAMPLE 6

Zeolite 3 with Bonding Agent

The zeolite is prepared as in Example 5, then 162 g of tetraethyl-silicate is added with vigorous stirring to 173 g of a solution of tetrapropyl-ammonium hydroxide at 12% by weight, and the resulting mixture is stirred 1 hour at 60° C.; then, 709 g of demineralized water is added, and the solution is kept stirred a further hour.

A clear solution is so obtained, into which 720 g is carefully dispersed of the centrifugation cake of zeolite 3, prepared as disclosed above, containing 9% by weight of TPA$^+$, 26% by weight of water, and 65% by weight of zeolite 3.

The milky suspension resulting from the dispersion is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 μm.

The atomized product is charged to a muffle under an N$_2$ atmosphere and is heated up to 550° C. After a 2-hour stay at that temperature, the atmosphere is gradually turned from N$_2$ to air, and the product is left standing a further two hours at 550° C. in air.

The obtained product has the following composition:

0.0025Fe$_2$O$_3$; 0.0188TiO$_2$; SiO$_2$.

EXAMPLE 7

Zeolite 4

A Titanium-Silicalite zeolite is prepared according to Example 1 of U.S. Pat. No. 4,410,501:

4,160 g of tetraethyl-silicate is charged to a pyrex-glass beaker, and to it, 137 g of tetraethyl-titanate firstly, and then 7,310 g of an aqueous solution at 25% by weight of tetrapropyl-ammonium hydroxide are added with stirring. The reaction mixture is kept stirred approximately 5 hours at 80° C., and then demineralized water is added, up to the volume of approximately 14 liters. The obtained mixture is charged to an autoclave, and is left standing 10 days at 175° C. under its autogenous pressure. The crystalline solid discharged from the autoclave is washed, dried and calcined at 550° C. The X-ray and I.R. analyses show that it is titanium-silicalite.

EXAMPLE 8

Zeolite 4 with Bonding Agent

The zeolite is prepared as in Example 7; then, 370 g of tetraethyl-silicate is added, with vigorous stirring, to 395 g of aqueous solution of tetrapropyl-ammonium hydroxide at 12% by weight, and the resulting mixture is stirred 1 hour at 60° C.; then, 1,620 g of demineralized water is added, and stirring is continued a further hour.

A clear solution is so obtained, into which 1,000 g is carefully dispersed of the zeolite 4, obtained as disclosed in Example 7.

The milky suspension resulting from the dispersion is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 μm.

The atomized product is charged to a muffle under an N$_2$ atmosphere and is heated up to 550° C. After a 2-hour stay at that temperature, the atmosphere is gradually turned from N$_2$ to air, and the product is left standing a further two hours at 550° C. in air.

The obtained product has the following chemical molar composition:

0.02TiO$_2$;SiO$_2$.

EXAMPLE 9

Zeolite 5 (Boralite C with Bonding Agent)

Boralite-C zeolite is prepared as in Example 14 of FR patent No. 2,429,182; then, 562 g of tetraethyl-silicate is added with vigorous stirring to 600 g of solution of tetrapropyl-ammonium hydroxide at 12% by weight, and the resulting mixture is stirred 1 hour at 60° C; then, 2,460 g of demineralized water is added, and stirring is continued a further hour.

A clear solution is so obtained, into which 1,450 g is carefully dispersed of the previously prepared Boralite-C zeolite.

The milky suspension resulting from the dispersion is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 μm.

The atomized product is charged to a muffle under an N$_2$ atmosphere and is heated up to 550° C. After a 2-hour stay that temperature under N$_2$, the at atmosphere is gradually turned from N$_2$ to air, and the product is left standing a further two hours at 550° C. in air.

The obtained product has the following composition:

SiO$_2$/B$_2$O$_3$=4.5.

EXAMPLE 10

Zeolite 6

To 6,090 g of an aqueous solution of tetrapropyl-ammonium hydroxide at 20%, 40 g of aluminum isopropoxide is added with stirring, and the obtained mixture is kept stirred, if necessary with a slight heating, up to complete dissolving.

To the obtained solution, 4,160 g of tetraethyl-silicate is added with stirring and possibly heating, until hydrolysis is complete, and a single-phase solution is obtained. Then, 9,500 g of demineralized water is added, and stirring is continued a further hour. The so-obtained solution, which has the following molar composition:

$SiO_2/Al_2O_3=200$;

$TPA^+/SiO_2=0.3$;

$H_2O/SiO_2=40$ is charged to a stainless-steel autoclave, and is heated, with stirring, to the temperature of 170° C., under its autogenous pressure, and is allowed to remain under these conditions for 4 hours; the autoclave is then cooled and discharged.

The obtained solution is centrifuged, and the solid is washed by re-dispersion and centrifugation. At the X-ray diffraction analysis of the powders, a portion of the calcined solid shows to be a ZSM-5-type zeolite.

EXAMPLE 11

Zeolite 6 with bonding Agent 550 g of tetraethyl-silicate is added with stirring to 590 g of aqueous solution of tetrapropyl-ammonium hydroxide at 12%, and the resulting mixture is stirred 1 hour at 60° C.; then, 2,400 g of demineralized water is added, and stirring is continued a further hour, while the solution is allowed to cool to approximately 25° C.

Into the so-obtained clear solution, 2,050 g is carefully dispersed of the washed centrifuge panel, prepared as disclosed in Example 10.

The panel contains approximately 70% by weight of zeolite. The resulting milky suspension is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 µm.

The atomizer is put under an $N_2$ atmosphere, the atmosphere is gradually turned from $N_2$ to air, and the product is left standing a further two hours at 550° C. in air.

The obtained product has, in its calcined and anhydrous form, the following composition, expressed as molar ratio:

$SiO_2/Al_2O_3=145$.

EXAMPLE 12

Zeolite 7

To 4,050 g of an aqueous solution of tetrabutyl-ammonium hydroxide at 40%, 50 g of aluminum isopropoxide is added with stirring, and the obtained mixture is kept stirred, if necessary with a slight heating, up to complete dissolving; the obtained solution is then diluted with 4,050 g of demineralized water.

To the obtained solution, 5,200 g of tetraethyl-silicate is added with stirring and possibly heating, until hydrolysis is complete, and a single-phase solution is obtained. Then, 11,900 g of demineralized water is added, and stirring is continued a further hour. The so-obtained solution, which has the following molar composition:

$SiO_2/Al_2O_3=203$;

$TPA^+/SiO_20.25$;

$H_2O/SiO_2=41$ is charged to a stainless-steel autoclave, and is heated, with stirring, to the temperature of 170° C., under its autogenous pressure, and is left under these conditions for 15 hours; the autoclave is then cooled and discharged.

The obtained suspension is centrifuged, and the solid is washed by re-dispersion and centrifugation. At the X-ray diffraction analysis of the powders, a portion of the calcined solid shows to be a ZSM 11-type zeolite.

EXAMPLE 13

Zeolite 7 with Bonding Agent 690 g of tetraethyl-silicate is added with stirring to 740 g of an aqueous solution of tetrapropyl-ammonium hydroxide at 12%, and the resulting mixture is stirred 1 hour at 60° C.; then, 3,000 g of demineralized water is added, and stirring is continued a further hour, while the solution is allowed to cool to approximately 25° C.

Into the clear solution so obtained, 2,550 g of the washed centrifuge panel, prepared as disclosed in Example 12, is carefully dispersed.

The panel contains approximately 70% by weight of zeolite. The resulting milky suspension is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 µm.

The atomizer is put under an $N_2$ atmosphere, the atmosphere is gradually turned from $N_2$ to air, and the product is left standing a further two hours at 550° C. in air.

The obtained solid has, in its calcined and anhydrous form, the following molar composition:

$SiO_2/Al_2O_3=145$.

EXAMPLE 14

Zeolite 8

A T zeolite (D. W. Breck, Zeolite Molecular Sieves, J. Wiley & Sons Ed., 1974, 288) was synthetized according to the process as disclosed in DE patent No. 3,139,355, and was then agglomerated according to the process of the present invention.

To 4,500 g of colloidal silica containing 40% of $SiO_2$, 360 g was added, with vigorous stirring, of aqueous solution of tetramethyl-ammonium hydroxide (25% by weight).

Separately, a solution was prepared by dissolving, in the order: 576 g of NaOH, 201 g of KOH and 474 g of $NaAlO_2$ (at 56% of $Al_2O_3$) in 8,300 g of demineralized water.

This solution was added to the preceding one with vigorous stirring, and stirring was maintained for approximately 2 hours.

The so-obtained reaction mixture, having the following composition, expressed as molar ratios:

$SiO_2/Al_2O_3 = 11.5$;

$K^+/SiO_2 = 0.12$;

$Na^+/SiO_2 = 0.48$;

$TMA^+/SiO_2 = 0.03$;

$H_2O/SiO_2 = 208$ was charged to a stainless-steel autoclave, was heated, to 190° C., and was left at this temperature, with stirring, under its autogenous pressure, for 2 hours; then, after cooling, the autoclave was discharged.

The obtained product was centrifuged, and the solid was washed by re-dispersions in water and centrifugations. A portion of the washed solid was calcined at 550° C. for three hours; when it was then analysed by X-ray diffraction of the powders, it showed to be a well-crystallized T zeolite.

The washed, not calcined solid, was exchanged three times, according to the known techniques, so to exchange with $NH_4^+$ all the exchangeable cations. At the end of the last centrifugation, a damp cake containing 85% of solids was obtained.

EXAMPLE 15

Zeolite 8 with Bonding Agent 550 g of tetraethyl-silicate is added with stirring to 590 g of an aqueous solution of tetrapropyl-ammonium hydroxide at 12% and the resulting mixture is stirred 1 hour at 60° C.; then, 2,400 g of demineralized water is added, and stirring is continued a further hour, while the solution is allowed to cool to approximately 25° C.

Into the clear solution so obtained, 1,250 g is carefully dispersed of the washed centrifuge panel, prepared as disclosed in Example 14.

The resulting milky suspension is fed to a spray-dryer (NIRO-ATOMIZER disk-atomizer; inlet air temperature 300° C.; outlet air temperature 120° C.; chamber diameter 1.5 m), compact microspheres being obtained, which have an average diameter close to 20 µm.

The atomizer is put under an $N_2$ atmosphere, the atmosphere is gradually turned from $N_2$ to air, and the product is left standing a further two hours at 550° C. in air.

We claim:

1. A process for producing a zeolite bonded with oligomeric silica, said process comprising:

(i) mixing a zeolite-in-water suspension with an aqueous solution of oligomeric silica and alkyl-ammonium hydroxide, the percentage of zeolite in the zeolite-in-water suspension being from 20% to 50% by weight, the molar ratio in the aqueous solution between the oligomeric silica and alkyl-ammonium hydroxide being from 0.05 to 0.2, the molar ratio between the oligomeric silica and water in the silica and alkyl-ammonium hydroxide solution being from 0.025 to 0.0125, the weight ratio between the oligomeric silica and zeolite in the mixture of solution and suspension being from 5:95 to 20:80, the zeolite having a pore diameter of from 5 Å to 13 Å, the zeolite being selected from the group consisting of:
    (a) a zeolite consisting of Si, Al and B;
    (b) a zeolite consisting of Si, Al and Ti;
    (c) a zeolite consisting of Si, Ti and Fe;
    (d) a zeolite consisting of Si and B;
    (e) Zeolite ZSM-5;
    (f) Zeolite ZSM-11; and
    (g) Zeolite T; and (ii) drying the mixture obtained in step (i).

2. A zeolite bonded with oligomeric silica, in the form of microspheres, having a weight ratio of oligomeric silica to zeolite within the range of 5:95 to 20:80, wherein the zeolite is selected from the group consisting of:
    (a) a zeolite consisting of Si, Al and B;
    (b) a zeolite consisting of Si, Al and Ti;
    (c) a zeolite consisting of Si, Ti and Fe;
    (d) a zeolite consisting of Si and B;
    (e) Zeolite ZSM-5;
    (f) Zeolite ZSM-11; and
    (g) Zeolite T.

3. The zeolite according to claim 2, wherein the microspheres have a diameter of from 5 to 1,000 µm.

4. The zeolite according to claim 2, wherein the zeolite consists of Si, Al, B, water and ammonium or alkyl-ammonium cations, having the following formula on a calcined, anhydrous basis, expressed as molar ratios:

$$pHAlO_2 . qB_2O_3 . SiO_2 \qquad (1)$$

wherein p is from 0.034 to 0.0050 and q is from 0.1 to 0.005.

5. The zeolite according to claim 4, wherein the following relationships are met for zeolite hydrates containing ammonium cations, where "Z" is the weight of the calcined and anhydrous zeolite, "$A^+$" is the weight of ammonium ion or of alkyl-ammonium cation, and "H" is the weight of water:

$$\frac{H}{H + A^+ + Z} \cdot 100 = 23\text{–}28\% \text{ and}$$

$$\frac{A^+}{H + A^+ + Z} \cdot 100 = 7\text{–}12\%.$$

6. The zeolite according to claim 5, wherein the $H^+$ of $HAlO_2$ is at least partially replaceable by cations.

7. The zeolite according to claim 4, wherein the zeolite of formula (1) has a powder X-ray diffraction spectrum of:

| d | $I_{rel}$ |
|---|---|
| 11.12 + 0.10 | vs |
| 9.98 + 0.10 | s |
| 9.74 + 0.10 | m |
| 6.34 + 0.07 | mw |
| 5.97 + 0.07 | mw |
| 4.24 + 0.05 | mw |
| 3.84 + 0.04 | s |
| 3.81 + 0.04 | s |
| 3.73 + 0.04 | s |
| 3.71 + 0.04 | s |
| 3.63 + 0.04 | m |
| 3.04 + 0.02 | mw |
| 2.97 + 0.02 | mw. |

8. The zeolite according to claim 2, wherein the zeolite comprises Si, Al, Ti, water and ammonium or alkyl-ammonium cations, having the following formula on a calcined, anhydrous basis, expressed as molar ratios:

$$pHAlO_2 . qTiO_2 . SiO_2 \qquad (2)$$

wherein p is larger than zero and smaller than or equal to 0.050, and q is larger than zero and smaller than or equal to 0.025.

9. The zeolite according to claim 8, wherein the following relationships are met, for zeolite hydrates containing ammonium cations, where "Z" is the weight of the calcined and anhydrous zeolite, "$A^+$" is the weight of ammonium ion or of alkyl-ammonium cation, and "H" is the weight of water:

$$\frac{H}{H+A^++Z} \cdot 100 = 23\text{--}28\% \text{ and}$$

$$\frac{A^+}{H+A^++Z} \cdot 100 = 7\text{--}12\%.$$

10. The zeolite according to claim 9, wherein the $H^+$ of $HAlO_2$ is at least partially replaceable by cations.

11. The zeolite according to claim 8, wherein the zeolite of formula (2) has a powder X-ray diffraction spectrum of:

| d | $I_{rel}$ |
|---|---|
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.82 + 0.04 | s |
| 3.82 + 0.04 | s |
| 3.75 + 0.04 | s |
| 3.72 + 0.04 | s |
| 3.65 + 0.04 | s |
| 3.05 + 0.02 | mw |
| 2.99 + 0.02 | mw. |

12. The zeolite according to claim 2, wherein the zeolite consists of Si, Ti, Fe, water and ammonium or alkyl-ammonium cations, having the following formula on a calcined, anhydrous basis, expressed as molar ratios:

$$pHFeO_2 \cdot qTiO_2 \cdot SiO_2 \quad (4)$$

wherein p is larger than zero and smaller than or equal to 0.050, and q is larger than zero and smaller than or equal to 0.025.

13. The zeolite according to claim 12, wherein the following relationships are met, for zeolite hydrates containing ammonium cations, where "Z" is the weight of the calcined and anhydrous zeolite, "$A^+$" is the weight of ammonium ion or of alkyl-ammonium cation, and "H" is the weight of water:

$$\frac{H}{H+A^++Z} \cdot 100 = 23\text{--}28\% \text{ and}$$

$$\frac{A^+}{H+A^++Z} \cdot 100 = 7\text{--}12\%.$$

14. The zeolite according to claim 13, wherein the $H^+$ of $HFeO_2$ is at least partially replaceable by cations.

15. The zeolite according to claim 12, wherein the zeolite formula (4) has an I.R. spectrum at least showing the following bands:

| wn | $I_{rel}$ |
|---|---|
| 1220–1230 | $w_{IR}$ |
| 1080–1110 | $s_{IR}$ |
| 960–975 | $mw_{IR}$ |
| 795–805 | $mw_{IR}$ |
| 550–560 | $m_{IR}$ |
| 450–470 | $ms_{IR}$ | wherein wn is the wave number as $cm^{-1}$, $I_{rel}$ is the relative intensity, $s_{IR}$ is 20 to 30, $ms_{IR}$ is 30 to 40, $m_{IR}$ is 40 to 50, $mw_{IR}$ is 50 to 70, and $w_{IR}$ is 70 to 80.

16. The zeolite according to claim 2, wherein the solution of silica and alkyl-ammonium hydroxide is prepared by hydrolyzing in liquid phase a tetraalkyl-orthosilicate in an aqueous solution of alkyl-ammonium hydroxide at a temperature of from 2° C. to 120° C., and for a time of from 0.2 to 24 hours.

17. The zeolite according to claim 16, wherein the solution of silica and alkyl-ammonium hydroxide is prepared at a temperature of from 50° C. to 60° C.

18. The zeolite according to claim 16, wherein the tetraalkyl-orthosilicate is tetraethyl-orthosilicate.

19. The zeolite according to claim 2, wherein the alkyl group of the alkyl-ammonium hydroxide has 1 to 5 carbon atoms.

20. The zeolite according to claim 19, wherein the alkyl-ammonium is tetrapropyl-ammonium.

21. The zeolite according to claim 2, wherein the percentage of zeolite in the zeolite-in-water suspension is from 25% to 35% by weight.

22. The zeolite according to claim 2, wherein the molar ratio in the solution between the oligomeric silica and alkyl-ammonium hydroxide is from 0.08 to 0.15.

* * * * *

UNITED STATES PATENT AND TRADEMARK OFFICE
CERTIFICATE OF CORRECTION

PATENT NO. : 5,500,199
DATED : March 19, 1996
INVENTOR(S) : Giuseppe Bellussi, Franco Buonomo, Antonio Esposito, Mario G. Clerici and Ugo Romano It is certified that error appears in the above-indentified patent and that said Letters Patent is hereby corrected as shown below: On the title page: Item [73]

Assignee: Eniricerche S.p.A.
Snamprogetti S.p.A.
Enichem Synthesis S.p.A.

Signed and Sealed this

Nineteenth Day of August, 1997

Attest:

BRUCE LEHMAN

Attesting Officer

Commissioner of Patents and Trademarks